Figure 1:
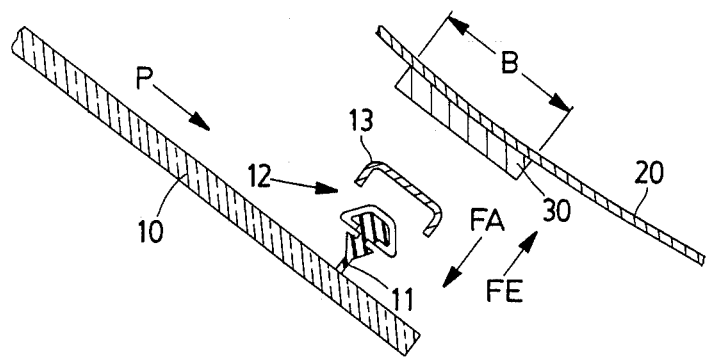

United States Patent [19]
Egner-Walter et al.

[11] Patent Number: 4,736,485
[45] Date of Patent: Apr. 12, 1988

[54] WINDSHIELD WIPER SYSTEM

[75] Inventors: Bruno Egner-Walter, Heilbronn; Eckhardt Schmid, Brackenheim, both of Fed. Rep. of Germany

[73] Assignee: SWF Auto-Electric GmbH, Bietigheim-Bissingen, Fed. Rep. of Germany

[21] Appl. No.: 933,222

[22] PCT Filed: Feb. 27, 1986

[86] PCT No.: PCT/DE86/00073
§ 371 Date: Oct. 30, 1986
§ 102(e) Date: Oct. 30, 1986

[87] PCT Pub. No.: WO86/05151
PCT Pub. Date: Sep. 12, 1986

[30] Foreign Application Priority Data
Mar. 2, 1985 [DE] Fed. Rep. of Germany ....... 3507446

[51] Int. Cl.[4] .............................................. B60S 1/32
[52] U.S. Cl. .................. 15/250.2; 15/250.16; 15/250.35
[58] Field of Search ............ 15/250.19, 250.20, 250.36–250.42, 15/25.35, 250.16

[56] References Cited
FOREIGN PATENT DOCUMENTS
252748 3/1967 Australia .
221747 12/1983 Japan .

Primary Examiner—Peter Feldman
Attorney, Agent, or Firm—James B. Raden; Robert P. Seitter

[57] ABSTRACT

This invention relates to a windshield wiper system in which, in order to relieve the wiper lip in the parking position of the windshield wiper, a magnet becomes effective whose force is without contact opposed to the contact pressure which in known manner is produced for example by a tension spring between fastening member and link of the wiper arm.

7 Claims, 2 Drawing Sheets

WINDSHIELD WIPER SYSTEM

This invention relates to a windshield wiper system according to the features of the preamble of claim 1.

In the usual windshield wiper systems the contact pressure, with which the wiper lip of a windshield wiper is pressed against the window pane to be cleaned, is produced by a tension spring, which is prestressed between the fastening member and the link of the wiper arm. Thus the contact pressure must be relatively great, so that the wiper blade is not lifted from the window pane even at high driving speed. However with a great contact pressure the wiper lip is constantly deformed in the parking position. This has an disadvantageous effect on the wiping performance.

Several solutions are known to cure this shortcoming. In one construction the suspension point of the tension spring is varied in the parking position and thus the contact pressure produced by this spring is reduced. In another solution, which is for example known from the German specification OS No. 1 680 194 the wiper arm hits an approach incline in the parking position, so that the wiper lip is relieved. Such an approach incline causes disturbing noises in particular, when the windshield wiper runs onto this approach incline in each wiping cycle. This disadvantage is cured in another embodiment of this printed specification in which in the parking position a tappet swivels the wiper against the force of the tension spring. During normal wiper operation this tappet is retracted by the force of a then excited electromagnet, however it is pressed towards the wiper arm by a spring when the wiper motor is switched off and the electromagnet is de-energized at the same time. In such a construction damages in the lacquer layer of the wiper arm and noises cannot be prevented, because the tappet abruptly hits the wiper arm. Finally a construction is known from the Austrian pat. No. 252 748 in which, for the production of the necessary contact pressure, a magnet arranged on the wiper arm co-operates with a segment-shaped armature, wherein the arc length of the armature is smaller than the wiping angle. Thus during the normal wiping angle the contact pressure is supported magnetically, whereby the contact pressure is favourably reduced in the reversing positions, however only to a value predetermined by the still effective tension spring. Thus a sufficient relief of the wiper lip can thereby not be achieved.

The present invention is based on the problem of creating a windshield wiper system in which a sufficient relief of the wiper lip in the parking position is provided.

This problem is solved according to the invention with the characterizing features of claim 1.

The invention is thereby based on the idea that with a transmission of the magnet force to the windshield wiper without contact disturbing noises cannot appear. Furthermore a damaging of the lacquer layer is prevented. Thus the basic idea of the present invention can also be realized when the windshield wiper system does not have a so-called concealed parking position and the windshield wipers are rather deposited in one of their reversing positions. Of course the invention is also applicable, when in the parking position the windshield wipers are deposited outside the normal wiping area.

Thus the principal feature of the present invention is to be seen in that in the parking position the magnet produces a force, which reacts opposite to the contact pressure produced by the tension spring. Thus in this point the present invention differs essentially from the prior art mentioned. In the construction according to the German specification OS No. 1 680 194 the magnet force is indeed effective in the same direction as the force of the tension spring. In the construction according to the Austrian pat. No. 252 748 the magnet is not at all effective in the parking position.

The basic idea of the present invention can be realized in various ways. In a first alternative the magnet co-operates with magnetizable, ferromagnetic parts. Thereby either a body member, e.g. the hood consisting of sheet metal, or the wiper arm and/or the supporting yoke of the wiper blade, which are normally also composed of sheet metal parts, can serve as a magnetizable part. It is true that the magnet and the magnetizable part move towards each other, so that the two parts could touch as a consequence. This however is disadvantageous, because then a too great torque has to be brought about to make the windshield wiper leave its parking position.

Therefore a construction is preferred in which in the parking position two magnets become effective preferably in such a way that these magnets repel each other. Then the windshield wiper can be particularly smoothly moved out of its parking position, since due to the relief of the wiper lip the friction on the window pane to be cleaned is reduced and the two magnets repelling each other produce an additional torque component.

In principle the basic idea of the present invention could also be realized with electromagnets. However permanent magnets are preferred, because they do not unnecessarily consume electric energy and can simply be integrated in already available parts, preferably a spoiler on the wiper arm or a blind on the rim of the window pane. These permanent magnets or their covers are formed preferably wedge-shaped in such a way that when the windshield wiper enters the parking position a continuously increasing relief of the wiper lip is achieved.

Figure 3:
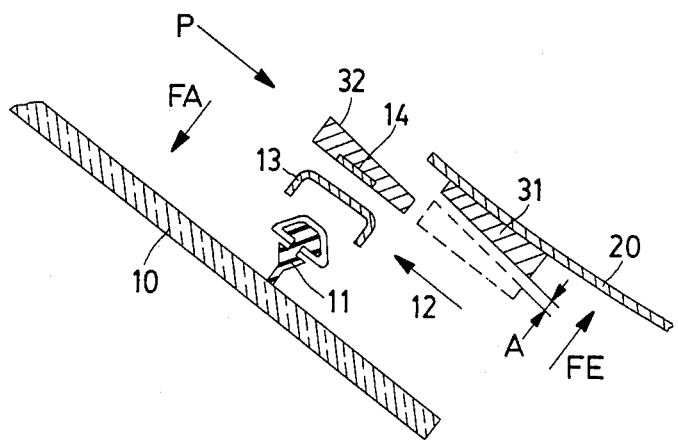
Figure 2:
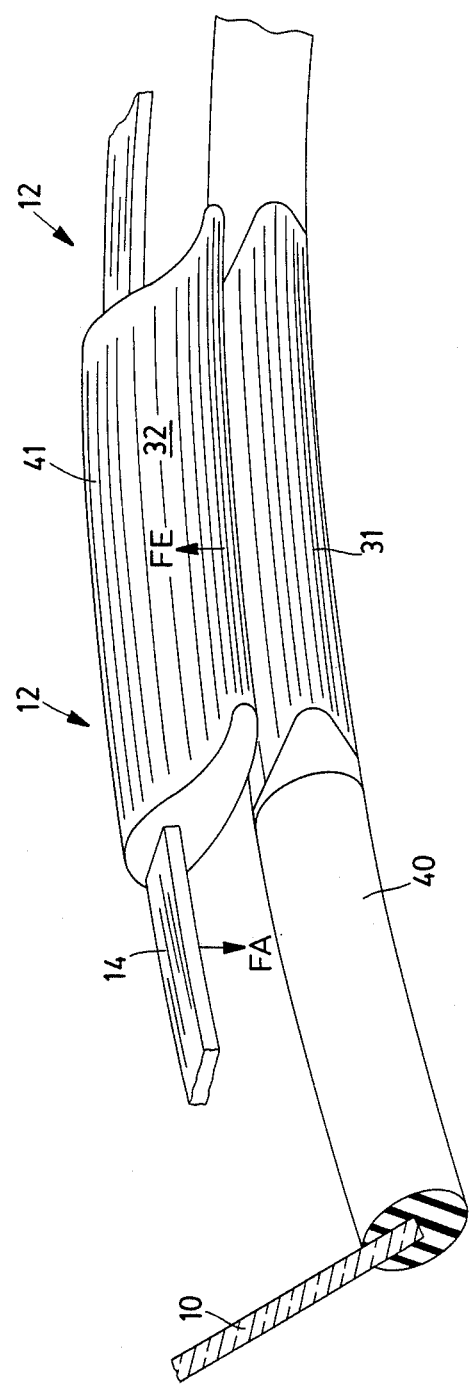

The invention and its advantageous embodiments are described in detail below by way of embodiments shown in the accompanying drawing, in which FIG. 1 is a schematic view of a first embodiment comprising a magnet FIG. 2 is a schematic view of a second embodiment with two magnets and FIG. 3 is a schematic view of a third embodiment.

In FIG. 1 the motor vehicle windshield to be cleaned is designated 10. The wiper lip 11 of a windshield wiper 12 only partially shown, whose supporting yoke is designated 13, is pressed against this window pane 10 with a given contact pressure FA by a tension spring not shown in detail. In FIG. 1 the windshield wiper 12 is shown in its parking position, in which it lies in an area below the hood 20. A permanent magnet 30 is fixed onto this hood 20 by means of a double adhesive tape. The width B of this permanent magnet 30 is so that its effectiveness extends over such an area which is at least as large as the tolerance range of the parking position of the windshield wiper, which enters its parking position in the direction of arrow P. By this given extension of the permanent magnet 30 in the moving direction of the windshield wiper 12 it is thus ensured that the windshield wiper 12 reaches the effective area of the permanent magnet in its parking position with wet or dry window pane.

In the embodiment according to FIG. 1 only one magnet is provided which co-operates with a magnitizable part which in this construction is realized by the metallic supporting yoke 13 and/or the metallic wiper arm of the windshield wiper. The permanent magnet exerts a force FE on this magnetizable part, which reacts opposite to the contact pressure FA. Thus in the parking position of the windshield wiper 12 the supporting yoke 13 is slightly lifted form the window pane to be cleaned, so that the wiper lip 11 is relieved. The force acts upon the supporting yoke 13 without contact. A spacer not shown in detail could be provided in order to prevent that the supporting yoke 13 rests upon the permanent magnet.

FIG. 2 shows a schematic, perspective view of an embodiment with two magnets 31 and 32. One permanent magnet 31 is integrated in a blind 40 on the lower rim of the window pane 10. The other permanent magnet 32 is integrated in a spoiler 41 which is fixed onto a wiper arm 14 of a windshield wiper in a known manner. Possibly the spoiler could also be completely made of a magnetic material. In the embodiment according to FIG. 2 the magnets 31 and 32 are magnetized in such a way that they repel each other. Thus the magnet force FE acts without force upon the windshield wiper 12 in a direction opposite to the contact pressure FA.

FIG. 3 at last shows an embodiment with two magnets 31 and 32 attracting each other. One magnet 31 is again secured on the hood 20, the other magnet 32 is fixed on the wiper arm 14. One can see from the drawing that both magnets are wedge-shaped. The wedge tip of the magnet 32 fixed on the windshield wiper 12 is directed in the moving direction of the windshield wiper entering the parking position. In contract thereto the wedge tip of the magnet 31 fixed on the body member points in the opposite direction. By this measure a continuous relief of the wiper lip 11 upon entering the parking position is achieved. Furthermore it is prevented that the windshield wiper 12 hits the magnets 31 secured on the body member 20. Finally by the shape and arrangement of the magnets 31 and 32 the spacing A between the two magnets of this construction can be kept small and thus only relatively small magnets are necessary. This idea can therefore accordingly be applied to the cover of the magnets. At last it is pointed out that in the embodiment according to FIG. 3 the magnet 31 could be omitted, because the magnet secured on the wiper arm could also directly co-operate with the hood 20 which consists of magnetizable material.

We claim:

1. A windshield wiper system for motor vehicles, said system comprising a windshield wiper having a wiper arm and a wiper blade associated therewith, said windshield wiper being urged in a first direction for contacting a window pane to be cleaned with a predetermined contact pressure and being movable between a parking position and a reversing position for cleaning a predetermined area of a window pane, first magnet means carried by said windshield wiper and second magnet means located at the parking position in spaced apart non-contact relationship from said first magnet means when said windshield wiper is in its parking position for cooperating with said first magnet means to provide a magnetic force acting opposite to the contact pressure whereby the contact pressure is reduced when the windshield wiper is in the parking position and the wiper blade maintains contact with the window pane in its parking position and during its movement between the parking position and the reversing position.

2. A windshield wiper system in accordance with claim 1 wherein one of said magnet means is a magnetizible part and the other magnet means is a magnet.

3. A windshield wiper system in accordance with claim 1 wherein said first and second magnet means are magnets.

4. A windshield wiper system in accordance with claim 3 wherein adjacent poles of said magnets have the same polarity and the magnetic force repels said windshield wiper from said first magnet means.

5. A windshield wiper system in accordance with claim 3 wherein adjacent poles of said magnets have opposite polarities and the magnetic force attracts said windshield wiper toward said first magnet means.

6. A windshield wiper system in accordance with claim 3 wherein said first and second magnets means are permanent magnets.

7. A windshield wiper system in accordance with claim 3 wherein said magnets are wedge shaped in cross-section and wherein said magnets are arranged such that their narrower ends point in opposite directions.

* * * * *